July 3, 1951 — O. L. ST. CLAIR — 2,559,049
CONSTANT TENSION FLIGHT CONTROL DEVICE FOR MODEL AIRPLANES
Filed June 29, 1948 — 3 Sheets-Sheet 1
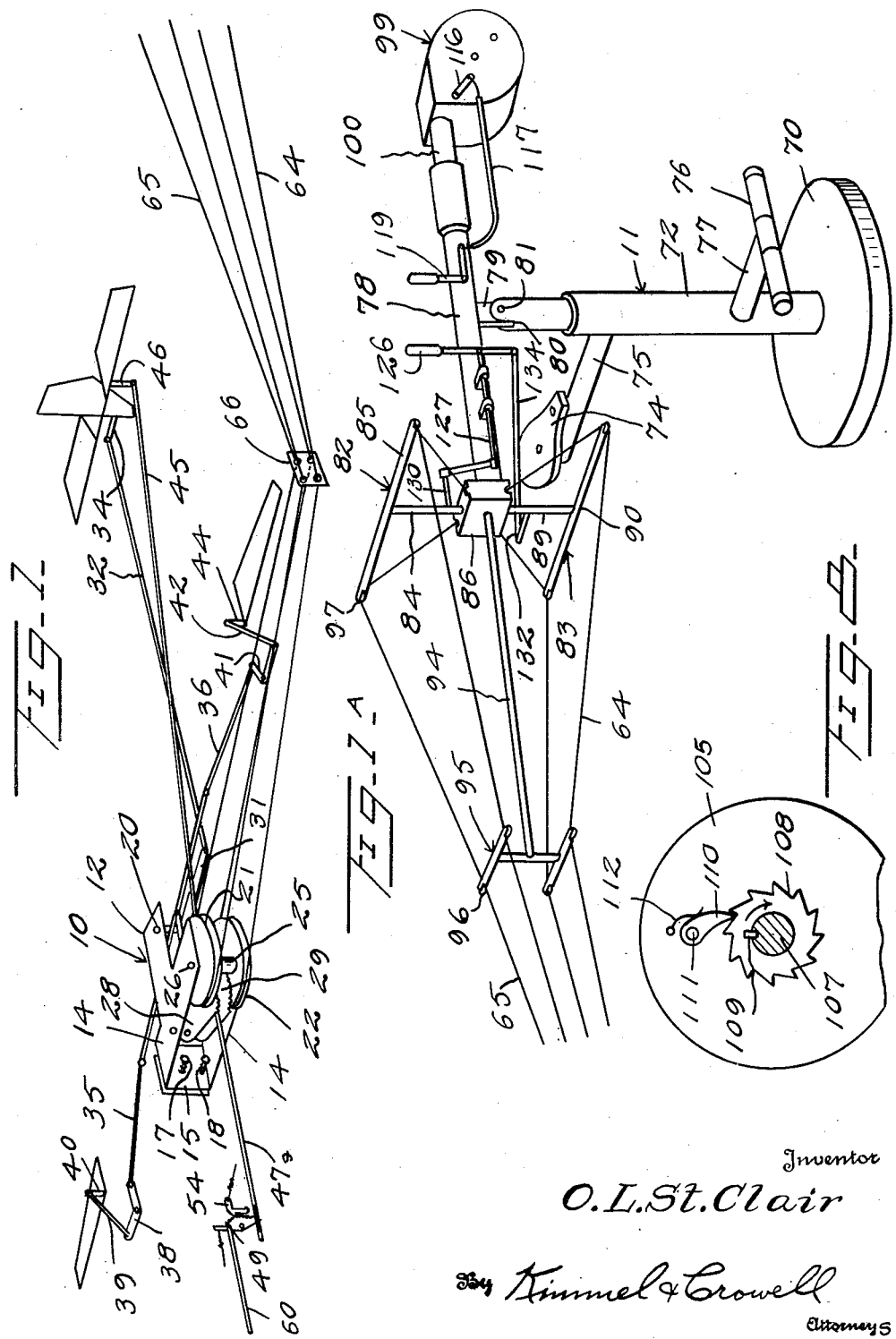
Inventor
O. L. St. Clair
By Kimmel & Crowell
Attorneys July 3, 1951 O. L. ST. CLAIR 2,559,049
CONSTANT TENSION FLIGHT CONTROL DEVICE FOR MODEL AIRPLANES
Filed June 29, 1948 3 Sheets-Sheet 2
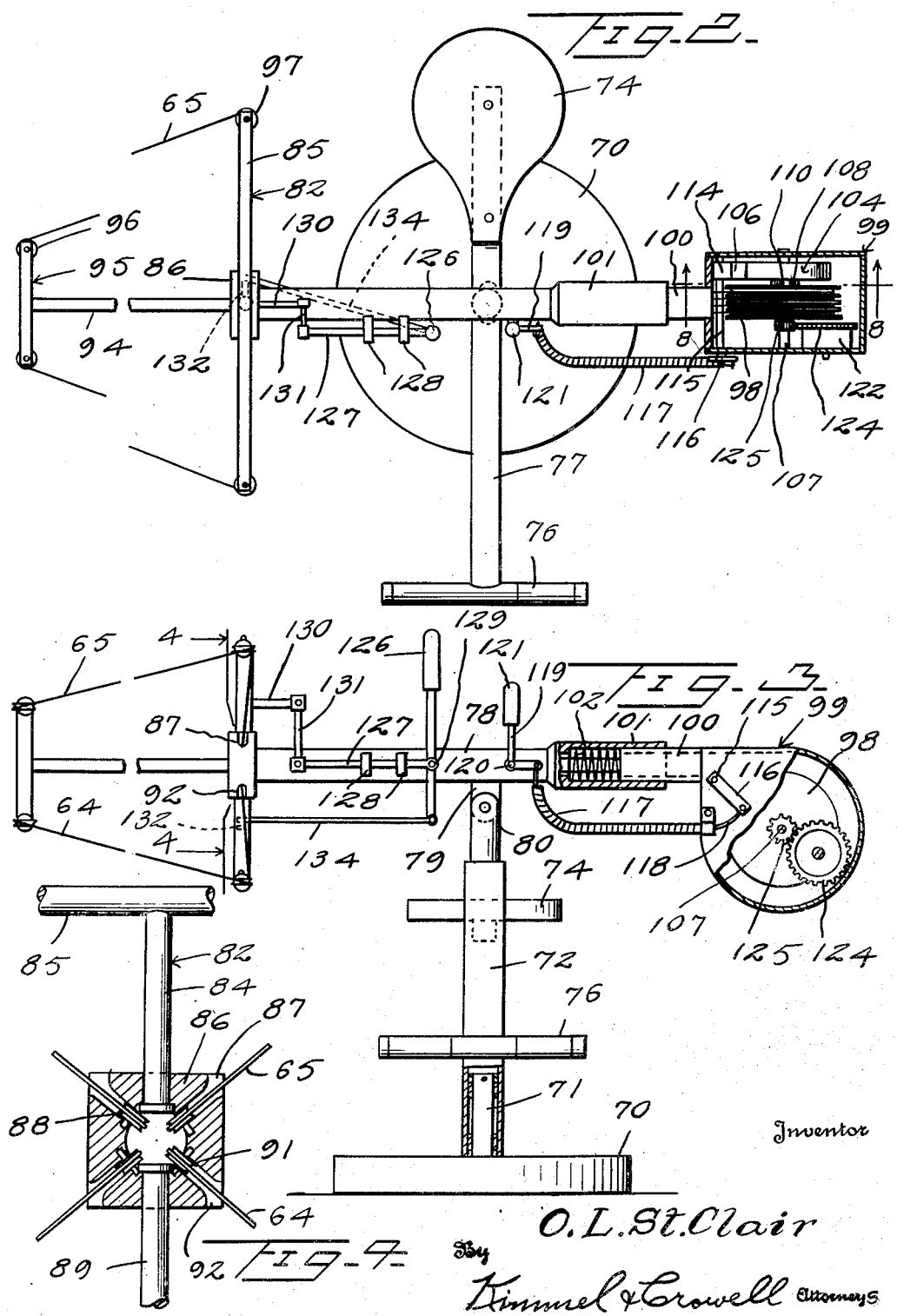
Inventor
O. L. St. Clair
By Kimmel & Crowell Attorneys

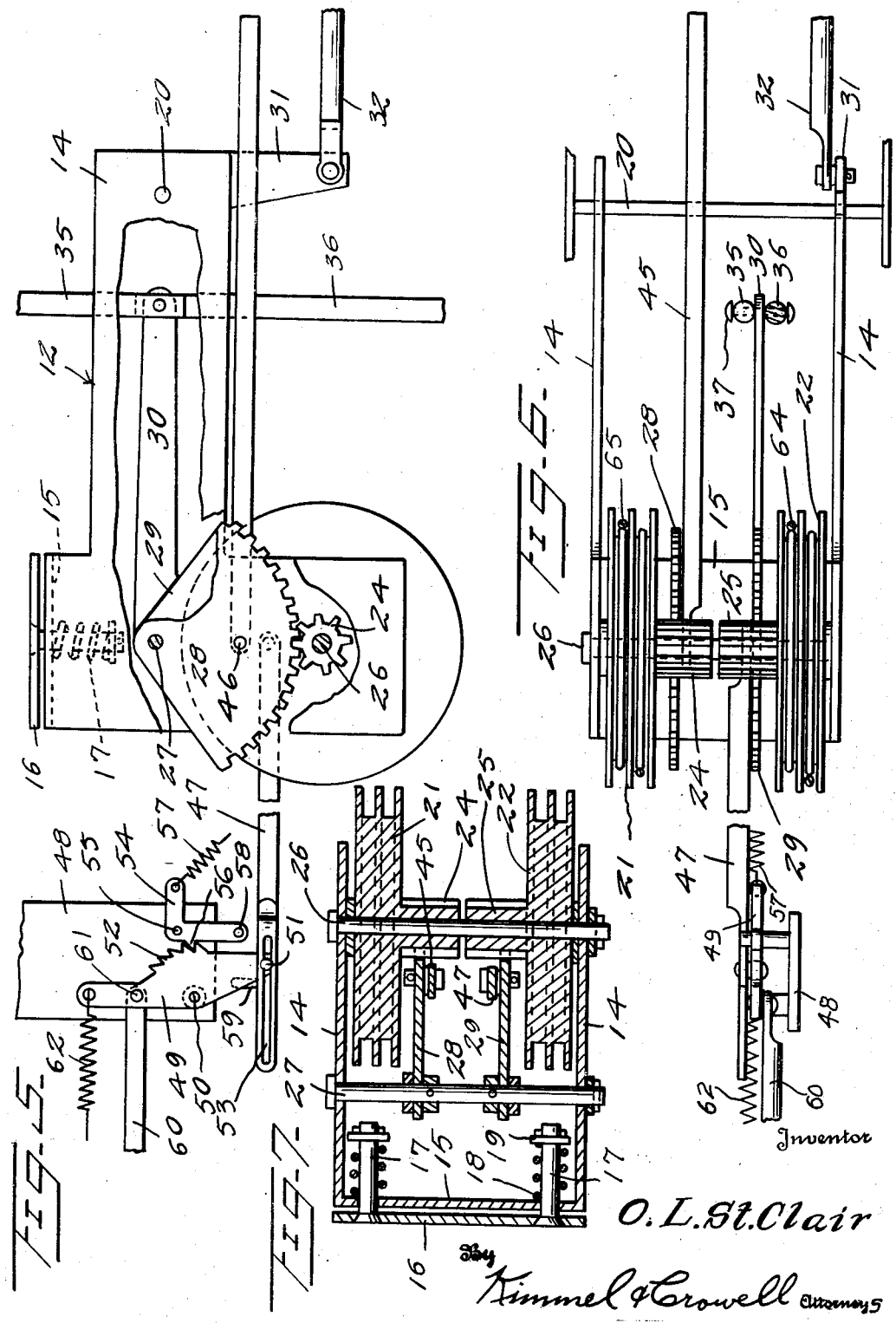

Patented July 3, 1951

2,559,049

UNITED STATES PATENT OFFICE 2,559,049

CONSTANT TENSION FLIGHT CONTROL DEVICE FOR MODEL AIRPLANES

Oba L. St. Clair, Eugene, Oreg.

Application June 29, 1948, Serial No. 35,801

7 Claims. (Cl. 46—77)

This invention relates to a flight control mechanism for gasoline powered model airplanes.

It is an object of this invention to provide a flight control mechanism for connection between a model airplane in flight and a central control on the ground whereby the airplane in flight may be fully controlled by an operator on the ground.

In the use of flight controls extending from the model in flight to a control mechanism on the ground, it is necessary that flexible means be utilized to provide for the free motion of the plane. Heretofore, in the use of such a control device, when the model moves towards the operator, the tension of the flexible connecting members is relaxed and the full control thereof is lost. With the use of the mechanism of this invention, means is provided for maintaining a constant tension on the control cables between the plane and operator irrespective of the relative position of the plane to the operator or the direction of the flight.

Another object of this invention is to provide a flight control mechanism of this kind which includes operative control connecting means between the operator and the control surfaces of the model, and operative control means for the engine.

Still another object of this invention is to provide a flight control for model airplanes whereby an operator on the ground may have full control of the control surfaces of the plane and the engine throttle.

A further object of this invention is to provide a flight control mechanism of the kind to be more particularly described hereinafter wherein the operator's controls substantially simulate the control structure normally found in full scale planes and operates in substantially the same manner.

Yet another object of this invention is to provide a control mechanism for actuating the control surfaces of a model airplane in flight wherein the actuation of one of the control surfaces effects the operation of the engine.

The full effect of the control mechanism to be herein described is maintained by the mechanism of the entire device which maintains a constant tension on the flexible cables between the operator and the plane, without which the operator would not maintain full control in all attitudes and positions of the plane relative to the operator.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a perspective diagrammatic view of the airplane control constructed according to an embodiment of this invention.

Figure 1a is a perspective view of the operator's control unit.

Figure 2 is a top plan view, partly broken away and partly in section, of the operator's control unit.

Figure 3 is a side elevation, partly broken away and partly in section.

Figure 4 is a fragmentary detailed section taken on the line 4—4 of Figure 3.

Figure 5 is a top plan view, partly broken away and partly in section of the airplane control unit.

Figure 6 is a longitudinal section of the airplane control unit.

Figure 7 is a transverse section.

Figure 8 is a fragmentary detailed section taken on the line 8—8 of Figure 2.

Referring to the drawings, the numeral 10 designates generally an airplane control unit for a gasoline powered model airplane and the numeral 11 designates generally an operator's control unit for association with the airplane control unit 10. The unit 10 is adapted to be fixed to and mounted in the model airplane for manipulating the flight controls and the throttle of the engine and is connected by suitable cables or other flexible members to the operator's control unit 11. The control unit 11 is adapted to be mounted on the ground in the center of the flight area and is mounted for rotation to be rotated about a fixed base by the operation of the model. The operator by sitting at the flight control unit 11 is able to control the direction of flight and the climb and dive attitude of the model together with the throttle during all phases of the flight.

Airplane control unit

The airplane control unit 10 is formed essentially of a fixed frame 12 which comprises upper and lower T-shaped plates 14 which are spaced apart for supporting the pulleys and bell cranks of this unit. The upper and lower plates 14 are connected together at one end of the cross arms of the T's by a bight member 15. A flat plate as 16 is adapted to be fixedly secured to the inner wall of the model by suitable fastening means. The bight portion 15 of the frame 12 overlyingly abuts the plate 16 and a pair of bolts as 17 are fixed to the plate 16 and extend through the bight portion 15. The pins or bolts 17 extend loosely through openings in the member 15 and springs as 18 are coiled about the pins 17. A washer or nut or other suitable retaining member as 19 is carried by the inner end of the pins 17 for restraining the springs thereabout. The outer ends of the springs engage the inner face of the bight member 15 for constantly pressing the bight member towards engagement with the fixed plate 16.

A pivot pin as 20 engages through the free end of the frame member 12 at the opposite ends from the cross arms thereof. The pin 20 is adapted to be fixed in the model and provides a pivot point about which the frame may be rocked or swung. A pair of pulleys as 21 and 22 are rotatably mounted within the frame 12 between the upper and lower plates thereof. The pulleys 21 and 22 are both provided with double grooves about which cables to be described hereinafter may be engaged.

The upper pulley 21 is provided with a depending pinion 24 and the lower pulley 22 is provided with an upstanding pinion 25. The pinions 24 and 25 are fixed to or otherwise mounted for simultaneous rotation with the respective pulleys. Both of the pinions 24 and 25 confront each other on the pivot bolt or pin 26. The pivot pin 26 extends through the plates 14 at the free end of the cross arm of the T frame. A second pivot pin as 27 is fixed between the plates 14 of the frame between the pin 26 and the bight member 15. A pair of segment gears as 28 and 29 are rockably mounted on the pin 27 intermediate the length thereof within the frame 12. The teeth of the gears 28 engage the gears of the pinion 24 so that the segment 28 will be rocked about the pivot pin 27 upon rotation of the pulley 21. The teeth of the segment gear 29 engage the lower pinion 25 so that the lower segment 29 may be rocked upon rotation of the lower pulley 22 about the pivot pin 26. A rearwardly extending lever arm 30 is fixed to or formed on one side of the lower segment 29. The lever arm 30 extends substantially directly rearwardly of the pivot pin 27. The lever arm 30 is provided for attachment to the control members which are connected to the ailerons of the model. The upper segment 28 is attached by rods and levers to the elevator of the model and the rudder is connected directly to the frame 12.

A lever arm 31 is fixed to or formed on the frame 12 at the rear end thereof and extends outwardly from the pivot pin 20 which rockably mounts the frame 12 within the plane. A link as 32 is rockably connected to the outer end of the lever arm 31 and is connected at its rear end to the horn 34 of the rudder. The outwardly extending rods 35 and 36 as shown in Figure 5 are connected between the lever arm 30 of the segment 29 and the aileron bell cranks. The rod or link 35 is pivotally connected to the free end of the lever arm 30 by a pin 37 and the outer end of the rod 35 is connected to one arm of the right aileron bell crank 38. The other arm of the bell crank 38 is connected by a link 39 to the horn 40 of the right aileron. The link or rod 36 extends outwardly to the other side of the model and is connected at its outer end to the bell crank 41 which in turn is connected by a rod 42 to the horn 44 of the left aileron.

A rearwardly extending rod or link 45 is pivotally connected to the upper segment gear 28 by a suitable pivot pin 46. The pin 46 is spaced outwardly from the pin 27 on which the segment is mounted. The rear end of the control rod 45 is pivotally mounted to the lower end of the depending horn 46 of the elevators.

In this manner the pulleys 21 and 22 are operatively connected to the aileron and elevator controls of the airplane while the frame 12 on which the pulleys are mounted is operatively connected to the rudder movement. The aileron controls are also connected to the throttle mechanism of the engine in the model. A forwardly extending rod as 47 is pivotally connected to the upper side of the lower segment gear 29. A plate 48 is fixedly mounted in the model plane forwardly of the frame 12. A lever as 49 is pivotally connected by a pivot pin 50 onto the mounting plate 48. The forward end of the control rod 47 is formed with an elongated slot 53. A pin 51 fixed on the lower end of the lever 49 loosely engages in the slot 53 to provide a lost motion connection between the rod 47 and the lever 49.

A segment of a ratchet gear 52 is fixed to or formed on the lever 49 concentric to the pivot 50 thereof. A pawl 54 is pivotally mounted by the pin 55 onto the plate 48 adjacent the ratchet 52. A tooth 56 of the pawl 54 engages the teeth of the ratchet 52 to provide for the movement of the ratchet and lever in one direction. A spring as 57 is fixed to one arm of the lever 54 on which the pawl is mounted and constantly urges the tooth 56 into engagement with the teeth of the ratchet. A pin as 58 is fixed to the depending arm of the lever 54 and a lug as 59 fixed adjacent the forward end of the rod 47 engages the pin 58 upon movement of the rod 47 rearwardly for disengaging the pawl from the ratchet.

A rod as 60 extends forwardly from the lever 49 for connection to the throttle control of the gasoline powered engine. The rear end of the rod 60 is pivotally connected by a pin 61 to the lever 49 above the pivot thereof and a spring as 62 connected also to the upper end of the lever 49 constantly urges the upper arm of the lever and the rod 60 forwardly to the throttle "off" position.

Flexible cables or wires as 64 and 65 connect the airplane control unit 10 to the operator's control unit 11. One set of cables as 64 engages about the lower pulley 22 and another set of cables as 65 engages about the upper pulley 21. Both of the cables 64 and 65 engage through a fairlead 66 fixed to or otherwise mounted on the model. The fairlead 66 or guide member may be mounted on the wing tip or in the forward portion of the fuselage.

In the use and operation of the airplane flight control 10 the rudder of the model is initially set for steering the model outwardly from the circle within which it is tethered. The airplane in flight will then be biased toward turning to the right or away from the center of its flight circle. This biased direction of flight will cause the plane to exert a tension on all of the cables 64 and 65. This tension will in turn pull the frame 12 counterclockwise when looking down on Figure 1 of the drawings. The movement to the left of the frame 12 about its pivot 20 will cause the rudder to turn to the left thereby releasing some of the strain off the cables and maintaining the direction of the airplane's flight substantially in the arc of the circle. The vertical direction of the model may be controlled by varying the tension on the cable 65 which engages about the upper pulley 21. The cable 65 is looped about the pulley 21 so that one stretch of the cable engages in the upper groove and the lower stretch engages in the lower groove. The lower stretch of the cable 65 tangentially engages the forward side of the pulley so that as the forward stretch of the cable is tensioned the pulley 21 will be rotated or at least biased for rotation in a counterclockwise direction. This rotation of the pulley 21 will move the rod 45 forwardly thus pulling the elevator down and directing the flight of the model downwardly. Tensioning of the rear stretch of the cable 65 will effect rotation of the pulley 21 in a clockwise direction for raising the elevator and thus pulling the nose of the plane upwardly.

The lower stretch of the cable 64 engages the forward side of the lower groove of the pulley 22. The upper stretch of the cable 64 extends tangentially from the rear edge of the upper groove of the pulley 22 for controlling the ailerons and the engine. Tensioning of the forward stretch of the cable 64 will effect rotation of the lower pulley 22 in a counter-clockwise direction for lowering the left wing of the plane. As the pulley 22 is rotated or biased or rotation in the counterclockwise direction, the lever arm 39 carried by the segment 29 is moved to the left as viewed in Figures 1 and 5 of the drawings. Movement of the rod 36 to the left will then effect rocking of the aileron control lever 41 in a clockwise direction thus raising the left aileron and causing the model to bank to the left. The rear stretch of the cable 64 engaging the opposite side of the pulley 22 when tensioned will effect the reverse movement of the segment 29 and rod 35 thus causing the model to bank to the right.

The control system is so arranged that movement of the controls for putting the plane in a left bank will effect the rocking of the lever 49 which controls the throttle of the engine. As the pulley 22 is moved in the counter-clockwise direction, the rear end of the slot 53 will engage the pin 51 on the lever 49. Subsequent small movements of the rod 47 forwardly will thus effect the rotation or pivoted movement of the lever 49 in a clockwise direction about its pivot 50 thereby moving the teeth of the ratchet 52 downwardly. The pawl 54 will engage in the teeth of the ratchet for holding the lever 49 in its position during the intermittent movement thereof. This step by step movement of the lever 49 in the clockwise direction will move the rod 60 rearwardly relative to the engine thus opening the throttle. For closing the engine or moving the throttle to the "off" position the pulley 22 is rotated in a clockwise direction so that the rod 47 is moved rearwardly. Rearward movement of the rod 47 will cause the pin 51 to be moved forwardly in the groove 53. At the extreme movement of the rod 47 rearwardly the lug 59 will engage the pin 58 on the lever 54 thus rocking the lever 54 counter-clockwise about its pivot 55 thereby releasing the tooth 56 of the pawl from the ratchet 52 and the spring 62 will bias the lever 49 and the arm 60 forwardly to the throttle "off" position.

*Operator's control unit*

The flexible cables 64 and 65 which extend outwardly from the fairlead 66 on the model are connected at their extreme inner end to the operator's control unit 11. The operator's control unit 11 is formed of a fixed base 70 having an upstanding bearing member 71 at the center thereof. A pedestal as 72 extends upwardly from the base 70 and is rotatably mounted on the bearing member 71. The pedestal 72 is free for rotation about the bearing 71 during the flight of the model. An operator's seat as 74 is fixed on a rearwardly extending arm 75 which in turn is fixed at its forward end onto the pedestal 72. Simulated rudder pedals as 76 are fixed to the pedestal 72 by a forwardly extending supporting arm 77. The rudder pedals 76 are fixed and in no way control the flight of the airplane but are so related to the seat 74 that the position of the operator relative to the base 70 and pedestal 72 is similar to the position of a pilot in the cockpit of a plane.

A horizontal supporting member as 78 is pivotally mounted to the upper end of the pedestal 72. The supporting member 78 is formed of a hollow tube open at both ends thereof. A depending ear as 79 is fixed to the lower surface of the supporting member 78 intermediate its length and engages between a pair of ears 80 fixed to or formed on the upper end of the pedestal 72. A pivot pin 81 extends through the ears 79 and 80 for pivotally mounting the supporting member 78 at the upper end of the pedestal 72. At the forward end of the tubular supporting member 78 there are provided a pair of opposed T-shaped guide members 82 and 83. The T-shaped guide member 82 is formed with an upwardly extending arm 84 having a cross arm 85 at the upper end thereof. The lower end of the upwardly extending arm 84 is rotatably supported in a bearing block 86 fixed to the forward end of the supporting member 78. Pulleys are rotatably supported on the opposite ends of the cross arm 85 of the guide member 82 about which both links of the upper control cable 65 may be engaged. The control cable 65 as it leaves the model is guided into two stretches and each stretch is trained over one of the pulleys at one end of the cross arm 85. The cable is then directed radially of the supporting member 78 and engages through an opening 87 in the bearing block 86. The stretches of the cable 65 are then engaged over the pulleys 88 so that the cable may be extended along the length of the supporting member 78 interiorly thereof.

The lower guide member 83 is formed with a depending arm 89 having a cross arm 90 fixed at the lower end thereof. The upper end of the supporting arm 89 is rotatably mounted in the bearing block 86 directly opposite from the supporting arm 84 of the guide member 82. The stretches of the cable 64 are trained about pulleys rotatably supported on the opposite ends of the cross arm 90. The cable stretches 64 are then directed radially of the supporting member 78 and engage about the lower pulleys 91 at the inner end of other openings 92 directly opposite from the openings 87 described above. Both stretches of the lower cable 64 will then be directed rearwardly in the supporting member 78 parallel to the cable 65 also directed along the length of the supporting member. A forwardly extending rod as 94 is fixed to the center of the bearing block 86 and is directed forwardly from the guide member 78 in the direction of the model. An H-shaped guide member 95 is fixed to the forward end of the supporting arm 94.

Pulleys as 96 are rotatably supported on the opposite ends of the horizontal parallel arms thereof so that the flexible cables 64 and 65 may be straightened in their direction before they come into engagement with the pulleys 97 mounted on the opposite ends of the cross arms of the guide members 82 and 83 described above. The ends of the cables 64 and 65 are wound about a winding drum 98 rotatably supported on the other end of the tubular supporting member 78.

The winding drum 98 is mounted within a housing 99 having a tubular supporting member 100 on one side thereof. A sleeve 101 open at both ends is fixed to the free end of the tubular member 78. The sleeve 101 is fixed on the supporting member 78 and the tubular portion of the housing 99 slidably engages within the connecting sleeve 101. A spring 102 is disposed within the connecting sleeve 101 and bears against the free inner end of the tubular member 100. The flexible cables extend through the tubular portion 100 of the housing 99 and then engage into grooves of the 4-grooved winding drum 98.

A brake member 104 is mounted within the housing 99. The brake comprises a brake drum 105 rotatably supported in the housing and a brake band 106 operatively disposed about the periphery of the drum. A shaft 107 is journalled at one end in one wall of the housing 99 as shown in Figure 2 of the drawings and the other end of the shaft 107 is journalled in the brake drum 105. The pulley 98 is fixed on the shaft 107 for rotation therewith. A ratchet 108 is fixed on the shaft 107 for rotation with the winding drum 98. The ratchet may be keyed onto the shaft by a key 109 as shown in Figure 8 of the drawings. A pawl 110 is rockably mounted on the inner surface of the brake drum 105 and is constantly biased about its pivot point 111 by a spring 112 into constant engagement with the teeth of the ratchet 108. The winding drum 98 is free to rotate in one direction relative to the brake drum 105 and the rotation of the brake drum is restrained by the engagement of the brake band thereabout.

A cam member 114 engages the brake band 106 at one terminal end thereof for controlling the tension of the brake band about the brake drum 105. The cam 114 is mounted at one end of a control shaft 115 journalled in the walls of the housing 99. A control lever 116 is fixed on the end of the shaft 115 outwardly of the housing 99. A Bowden cable is connected to the lever 116 for controlling the brake. The Bowden cable includes an outer flexible tubular housing 117 which is fixed at one end to the housing 99 and at the other end to the supporting member 78. The inner flexible member 118 of the Bowden cable is slidable in the housing 117 and is connected at one end to the control lever 116. A brake control lever 119 is rockably mounted on the supporting member 78 by a pivot 120. A handle as 121 is fixed or formed on the free arm of the lever 119 to provide a grip for the operator in controlling the brake.

A coiled spring as 122 is mounted within the housing 99 for constantly biasing the winding drum 98 in one direction. A gear 124 is operatively connected to the spring 122 and engages in a pinion gear 125 fixedly mounted on the shaft 107 on which the winding drum 98 is mounted. The spring 122 constantly biases the winding drum for reeling in the flexible cables 64 and 65. The spring 122 constantly holds the cables 64 and 65 in a tension and when that tension is lessened by the movement of the model inwardly of its flight path toward the operator's control unit 11, the spring rotates the drum 98 for maintaining the tension. This tension will be exerted on the control cables 64 and 65 irrespective of the freedom of the brake drum for rotation; in other words, the winding drum 98 will pull the cables 64 and 65 inwardly at all times and the cables may be drawn outwardly only by releasing the brake band about the brake drum 105.

A control stick 126 is mounted on the supporting member 78 for controlling the tension of selected ones of the stretches of the flexible cables 64 and 65. The control stick 126 is pivotally mounted intermediate its length on a shaft 127 for movement in a plane parallel to the longitudinal axis of the supporting member 78. The shaft 127 is rotatable supported in a pair of bearings 128 fixed on one side of the supporting member 78. A pivot pin 129 extends through one end of the shaft 127 for mounting the control stick 126 thereon. A radially extending arm 130 extends from the upwardly extending rotatable arm 84 of the guide member 82. The arm 130 is rigidly connected to the member 84 and pivotally connected to link 131, link 131 being rigidly connected to shaft 127. A link as 131 is connected between the arm 127 and the arm 130 for rotating the bearing member 82 about its vertical axis. The link 131 rotates with the shaft 127 and is free to pivot in a plane passing through the axis of rotation of the shaft 127. By moving the control stick 126 forwardly or rearwardly relative to the seat 74 the shaft 127 is caused to rotate in the bearings 128. Rotation of the shaft 127 will effect rocking movement of the link 131 about the axis of the shaft 127. This movement will in turn effect rotation of the vertical arm 84 about a vertical axis thereby moving the ends of the horizontal arm 85 toward or away from the model and also increasing the tension on one stretch of the cable 65 and decreasing the tension on the other stretch of the cable. This variation in tension on the stretches of the cables 65 will effect the rotation of the correlated pulley 21 in the airplane control unit. In other words, movement of the control stick 126 fore and aft relative to the seat 74 will effect the movement of the elevator in the same relative relation as the movement of the control stick of an airplane. Pivoted movement of the control stick 126 to either side of the pivot 129 effects the control of the ailerons of the model.

An arm 132 is fixed on the vertical arm 89 of the guide member 83. The arm 132 extends parallel to the horizontal arm 90 of the guide member 83. A link or rod 134 is fixedly connected to the free end of arm 132 at one end and at the other end universally pivotally connected to the end of the control stick 126. The movement of the control stick about the pivot 129 in a plane along the length of the axis of the supporting member 78 will effect rotation of the guide member 83 about the axis of its supporting arm 89. This rotation of the guide member 83 will control selectively the tension of one of the stretches of the cable 64 engaging this guide member. This side movement of the control stick 126 will then control the rotation of the pulley 22 of the airplane control unit thus effecting the movement of the ailerons of the model and, in turn, the throttle opening of the engine.

In this manner the complete control of the model airplane is effected by the operator at all times by using the control unit 11 thus described. The airplane is fully tethered to the control unit 11 and as the model traverses the circular flight path, the control unit 11 is rotated about the supporting base and the operator sitting on the seat 74 which is fixed on the pedestal 72 will at all times be in the same relative position to the airplane throughout the entire flight.

Having thus described my invention, what I claim is:

1. An airplane control unit for an airplane having movable control surfaces and an engine, adapted for connection to an operator's control unit, comprising a frame, means pivotally mounting said frame on said airplane, resilient means biasing said frame towards one position in said airplane, control members rockably mounted on said frame, means connecting said frame to one of said control surfaces for actuation upon movement of said frame on its pivot, means operatively connected between said control members and the other control surfaces for actuation upon rocking of said members, engine control means operably connected between said engine and one of said control members for actuating said engine control upon actuation of one of said other control surfaces, and flexible members connected between said control members and said operator's control unit.

2. An airplane control unit for an airplane having a movable rudder, ailerons and elevator, and adapted for connection to a remote operator's control unit, comprising a frame, means pivotally mounting said frame on said airplane, spring means biasing said frame to one pivoted position, a lever arm fixed on said frame, a rod pivotally connected at its ends between said arm and the rudder for moving the rudder upon pivoted movement of said frame, a pair of control members rockably mounted on said frame, a control lever pivotally mounted on said frame adjacent one of said members, a lever arm on said control lever, links connected between said latter lever arm and said ailerons, a gear segment fixed on said lever, a pinion on each of said control members, a second gear segment rockably mounted on said frame, said pinions engaging said segments effecting the movement thereof upon rocking of said members, a link between said second segment and the elevator, and a flexible connecting member between said control members and said operator's control unit.

3. An airplane control unit for a powered airplane having a rudder, ailerons, elevator, and an engine control rod, and adapted for connection to a remote operator's control unit, comprising a frame, means pivotally mounting said frame on said plane, resilient means biasing said frame to one pivoted position, a rod connected between said frame and said rudder for moving the rudder upon movement of said frame about its pivot, a pair of control members rockably mounted on said frame, a pinion fixed on each of said members, a pair of gear segments rockably mounted on said frame, each of said segments engaging one of said pinions, a connecting rod between one of said segments and said elevator, a connecting rod between said ailerons and the other segment, a flexible connecting member between said control members and said operator's control, and a rod pivotally mounted on said other segment operatively connected to said engine control rod.

4. An airplane control unit for a powered airplane having a rudder, ailerons, elevator, and an engine control rod, and adapted for connection to a remote operator's control unit, comprising a frame, means pivotally mounting said frame on said plane, resilient means biasing said frame to one pivoted position, a rod connected between said frame and said rudder for moving the rudder upon movement of said frame about its pivot, a pair of control members rockably mounted on said frame, a pinion fixed on each of said members, a pair of gear segments rockably mounted on said frame, each of said segments engaging one of said pinions, a connecting rod between one of said segments and said elevator, a connecting rod between said ailerons and the other segment, a flexible connecting member between said control members and said operator's control, a rod pivoted at one end on said other segment, a lever pivoted intermediate the length thereof forwardly of said frame, a lost motion connection between said latter rod and said latter lever, ratchet teeth on said latter lever radially of the pivot thereof, a spring pressed pawl engaging said ratchet teeth for limiting the movement of said lever to one direction upon movement of said latter rod in one direction and a lug on said latter rod engageable with said pawl upon movement of the rod in the opposite direction for disengaging said pawl from said ratchet.

5. In a flight control device for engine powered model airplanes having movable control surfaces and an engine throttle, an airplane control unit for connection to an operator's control unit, comprising a frame pivoted in said plane, means connecting said frame to one of said control surfaces for movement thereby, a pair of control members rockably mounted on said frame, means connecting said control members to the other control surfaces, an engine throttle control member pivotally connected to one of said control members, means operative on movement of said throttle control member in one direction for moving the throttle in one direction, said latter means including means operative upon movement of said latter member in the opposite direction for moving the throttle in the opposite direction.

6. In a constant tension flight control device for powered model airplanes having an airplane control unit, an operator's control unit and flexible connecting members between said control units, said operator's control unit comprising a base, a pedestal rotatably mounted on said base, a horizontal tubular member pivotally mounted on said pedestal, a shaft disposed parallel to said tubular member and rotatably carried by the latter, a control lever, a pivot mounting said lever on said shaft, a winding drum on one end of said tubular member, said flexible members extending through said tubular member and being engaged about said drum, spring means constantly biasing said drum for rotation in one direction, means controllably limiting the rotation of the drum in the opposite direction, a pair of opposed guide members rotatably mounted on the other end of said tubular member, said flexible members being trained over the opposite ends of said guide members, means operably connecting one of said guide members with said control lever for rotation thereby, means operably connecting the other of said guide members with said rotatable shaft for rotation thereby, whereby said control lever and shaft may be actuated for selectively varying the tension on selected flexible members thereby effecting operation of said airplane control unit.

7. In a constant tension flight control device for powered model airplanes having an airplane control unit, an operator's control unit and flexible connecting members between said control units, said operator's control unit comprising a base, a pedestal rotatably mounted on said base, a horizontal tubular member rockably mounted on said pedestal, a brake drum rotatably mounted on one end of said tubular member, a winding drum rotatably mounted on said one end concentrically with said brake drum, means carried by said drums limiting the rotation of said winding drum to one direction relative to said brake drum, means for controlling the rotation of said brake drum, a pair of opposed T-shaped guide members rotatably mounted on the other end of said tubular member, means carried by said guide members for leading said flexible members from the cross arms thereof into said tubular member and about said winding drum, a control stick swivellably mounted on said tubular member, and means connecting each of said guide members to said control stick for separate rotation upon movement of said stick in separate vertical planes for selectively controlling the tension on selected ones of said flexible members.

OBA L. ST. CLAIR.

REFERENCES CITED

The following references are of record in the file of this patent:

UNITED STATES PATENTS

| Number | Name | Date |
|---|---|---|
| 1,839,099 | Helmke | Dec. 29, 1931 |
| 2,061,953 | Sampson | Nov. 24, 1936 |
| 2,292,416 | Walker | Aug. 11, 1942 |
| 2,390,307 | Kelecius | Dec. 4, 1945 |
| 2,404,922 | Padgett | July 30, 1946 |
| 2,406,874 | Walker | Sept. 3, 1946 |
| 2,432,119 | Nash et al. | Dec. 9, 1947 |
| 2,523,902 | Effinger | Sept. 26, 1950 |